US006750569B2

(12) United States Patent
Liao

(10) Patent No.: US 6,750,569 B2
(45) Date of Patent: Jun. 15, 2004

(54) USB TRANSMISSION LINE HAVING SWITCHING FUNCTION

(76) Inventor: Sheng Hsin Liao, No. 10, Alley 38, Lane 229, San Chung St, Shulin City Taipei (TW)

( * ) Notice: Subject to any disclaimer, the term of this patent is extended or adjusted under 35 U.S.C. 154(b) by 99 days.

(21) Appl. No.: 10/206,667

(22) Filed: Jul. 29, 2002

(65) Prior Publication Data

US 2003/0222510 A1 Dec. 4, 2003

(30) Foreign Application Priority Data

Jul. 1, 2002 (TW) ...................................... 91209973 U

(51) Int. Cl.[7] .................................................. H02B 1/20
(52) U.S. Cl. ....................................................... 307/147
(58) Field of Search ......................... 307/147; 361/826; 174/128.1; 439/638

(56) References Cited

U.S. PATENT DOCUMENTS 6,210,216 B1 * 4/2001 Tso-Chin et al. ........... 439/545

* cited by examiner

*Primary Examiner*—Gregory J. Toatley, Jr.
(74) *Attorney, Agent, or Firm*—Browdy and Neimark, P.L.L.C.

(57) ABSTRACT

A USB transmission line having switching function comprises a transmission line, a first connector, a second connector, and a circuit unit. The first and second connectors are USB connectors, and are connected at two ends of the transmission line. The circuit unit has switching function of unidirectional transmission and bi-directional transmission, and is disposed on the transmission line between the first and second connectors. The transmission line can thus flexibly select the unidirectional transmission function or the bi-directional transmission function according to practical necessity.

5 Claims, 5 Drawing Sheets

USB TRANSMISSION LINE HAVING SWITCHING FUNCTION

BACKGROUND OF THE INVENTION

1. Field of the Invention

The present invention relates to a USB transmission line having switching function and, more particularly, to a transmission line whose two ends are connected with USB connectors to have both unidirectional transmission and bi-directional transmission functions.

2. Background of the Invention

Nowadays, various kinds of wired communication electronic equipments like computers, modems, telephones, or facsimile apparatuses inevitably need to use transmission lines of appropriate length to achieve electric connection.

Universal serial bus (USB) transmission lines are a common kind of transmission lines. As shown in FIG. 1, a conventional USB transmission line comprises a transmission line 10*a* and two connectors 20*a* and 30*a* connected at two ends of the transmission line 10*a*. The two connectors 20*a* and 30*a* are USB connectors.

Conventional USB transmission lines can be approximately divided into unidirectional transmission type and bi-directional transmission type. Either the unidirectional transmission type or the bi-directional transmission type has only a single transmission function. That is, a unidirectional USB transmission line cannot be used for bi-directional transmission, while a bi-directional USB transmission line cannot be used for unidirectional transmission. Therefore, the USB transmission line has a limited usage, and cannot be flexibly utilized, resulting in inconvenience in use.

Accordingly, the above conventional USB transmission lines have inconvenience and drawbacks in practical use. The present invention aims to resolve the problems in the prior art.

SUMMARY OF THE INVENTION

The primary object of the present invention is to provide a USB transmission line having switching function, wherein a circuit unit having the switching function of unidirectional transmission and bi-directional transmission is disposed on a USB transmission line. A switch can be used to control the use of a unidirectional transmission circuit or a bi-directional transmission circuit so that the USB transmission line can flexibly select the unidirectional transmission function or the bi-directional transmission function. The USB transmission line can thus have both unidirectional transmission and bi-directional transmission functions, resulting in more convenient, more flexible, and wider use.

To achieve the above object, the present invention provides a USB transmission line having switching function, which comprises a transmission line, a first connector, a second connector, and a circuit unit having switching function of unidirectional transmission and bi-directional transmission. The first and second connectors are USB connectors, and are connected at two ends of the transmission line. The circuit unit is disposed on the transmission line between the first and second connectors.

The various objects and advantages of the present invention will be more readily understood from the following detailed description when read in conjunction with the appended drawing, in which:

DETAILED DESCRIPTION OF THE PREFERRED EMBODIMENTS

Figure 1:
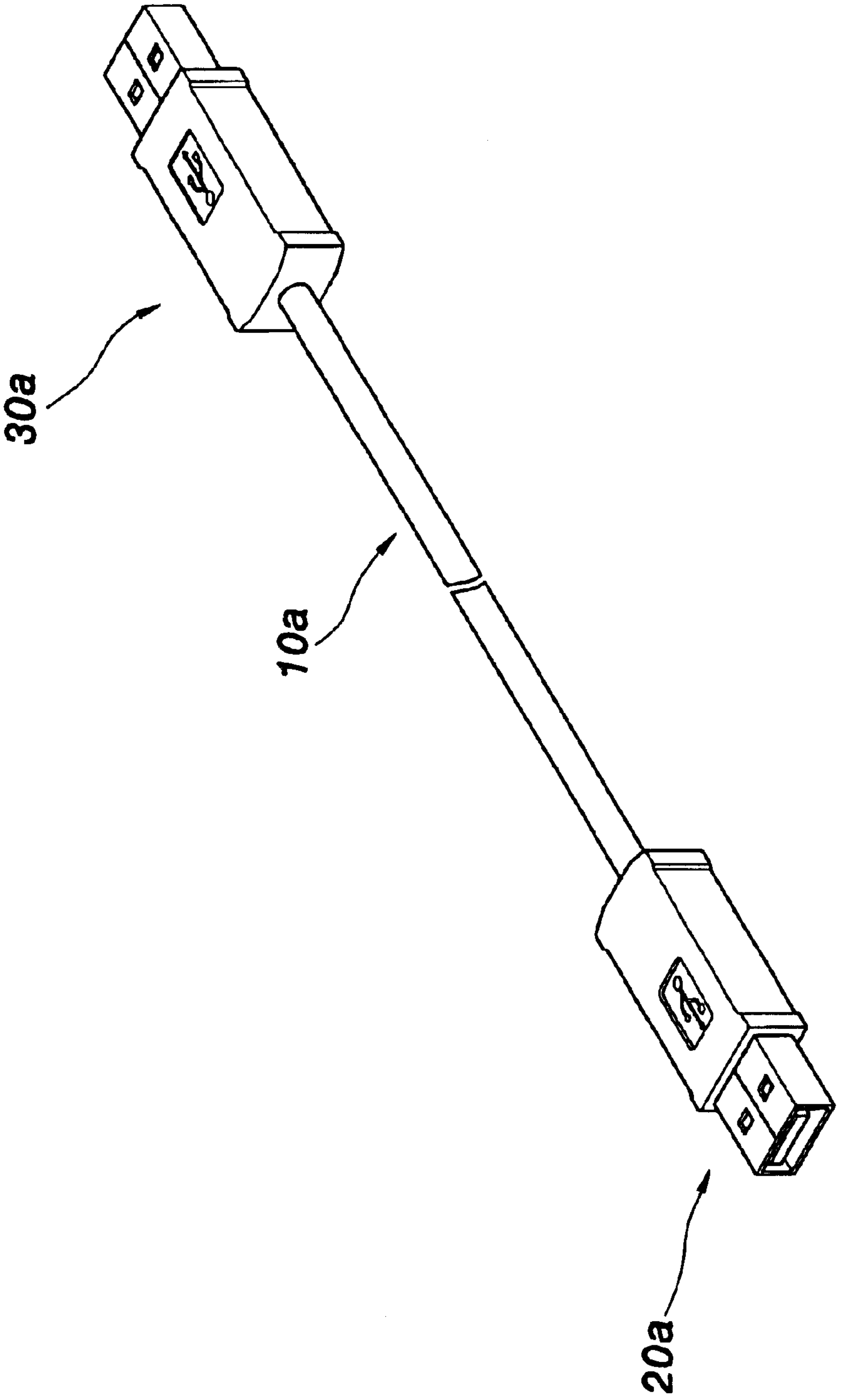
FIG. 1 PRIOR ART
FIG. 1 is a perspective view of a conventional USB transmission line.
Figure 2:
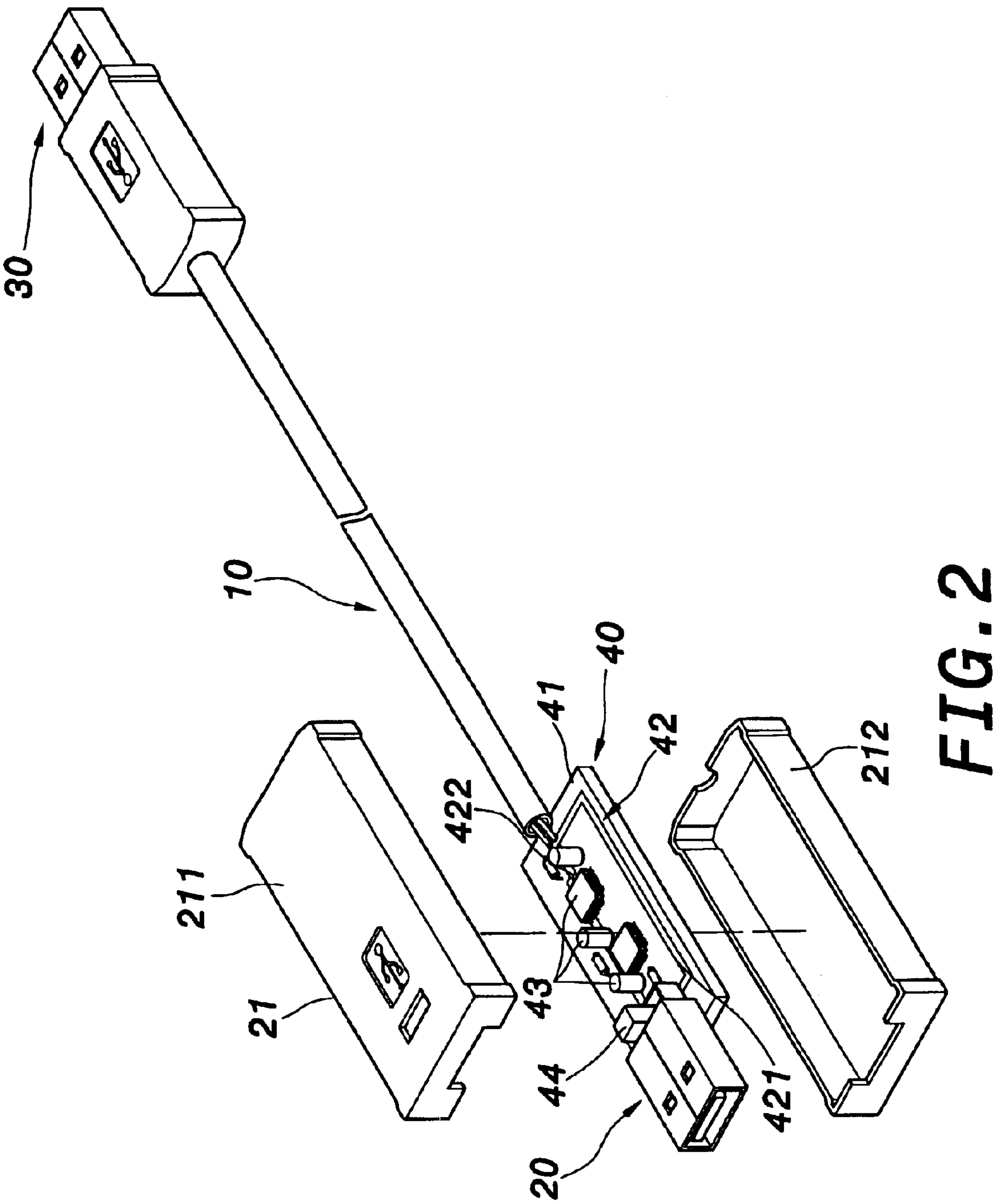
FIG. 2 is an exploded perspective view of the present invention.
Figure 3:
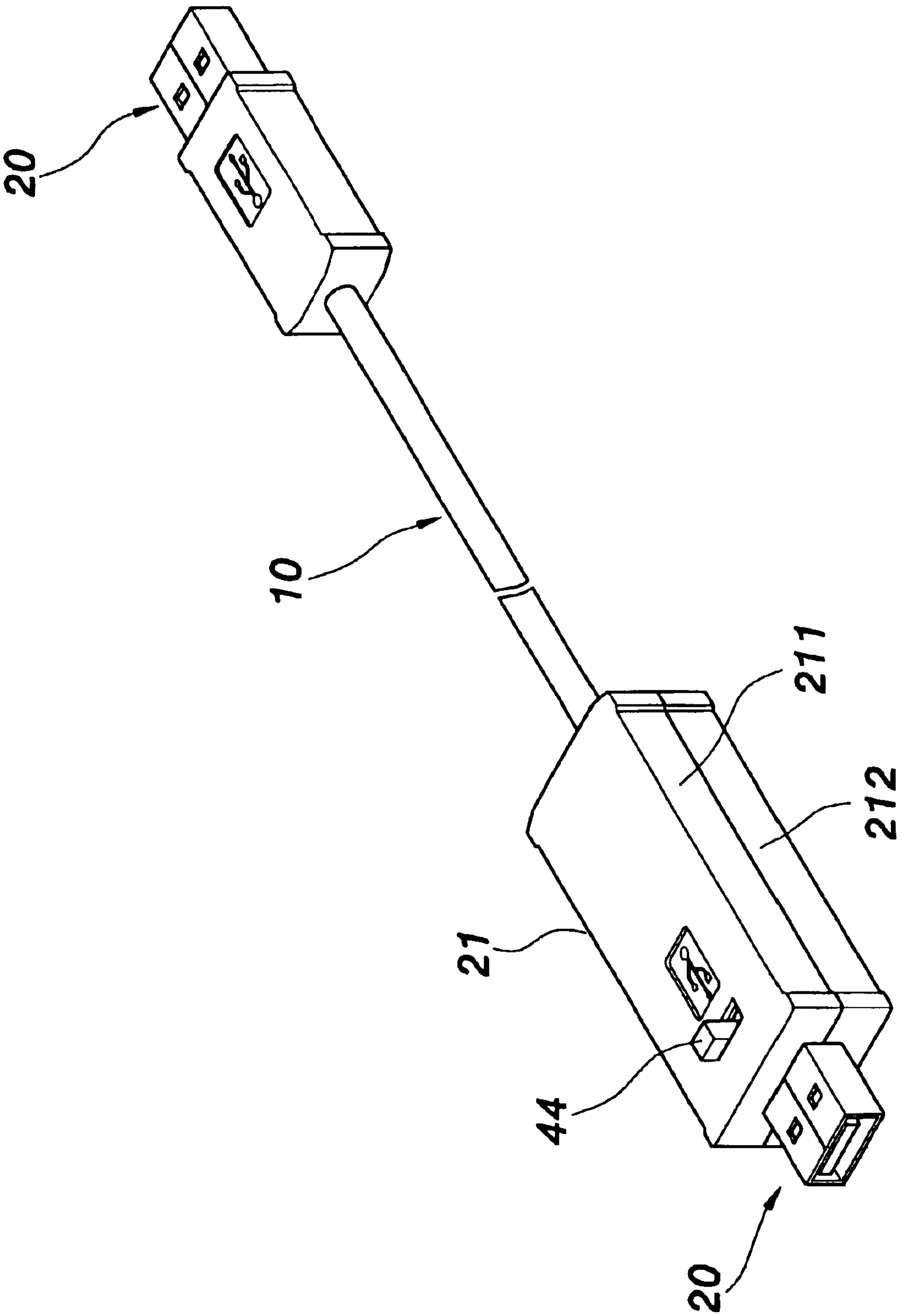
FIG. 3 is a perspective assembly view of the present invention.

As shown in FIGS. 2 and 3, the present invention provides a USB transmission line having switching function, which comprises a transmission line 10, a first connector 20, a second connector 30, and a circuit unit 40. The first and second connectors 20 and 30 are USB connectors connected at two ends of the transmission line 10. Because the transmission line 10, the first connector 20, and the second connector 30 are well known in the prior art, they will not be further described below.

The present invention is characterized in that the circuit unit 40 having switching function of unidirectional transmission and bi-directional transmission is disposed on the transmission line 10 between the first and second connectors 20 and 30.

The circuit unit 40 has a circuit board 41, which is disposed at any position on the transmission line 10 between the first and second connectors 20 and 30. In this embodiment, the circuit board 41 of the circuit unit 40 is disposed in a shell body 21 of the first connector 20. The shell body 21 is composed of a first half shell 211 and a second half shell 212. The first half shell 211 and the second half shell 212 are assembled together by locking with screws or supersonic splicing to sheathe the circuit unit 40.

The circuit board 41 is located between one end of the transmission line 10 and the first connector 20. That is, the first connector 20 and one end of the transmission line 10 are fixedly soldered and electrically connected onto the circuit board 41.

The circuit board 41 has a circuit layout 42, electronic components 43, and a switch 44 thereon. The circuit layout 42 has a unidirectional transmission circuit 421 and a bi-directional transmission circuit 422. The electronic components 43 are fixedly soldered onto the circuit board 41, and electrically connected to the bi-directional transmission circuit 422. Operations of the electronic components let the bi-directional transmission circuit 422 have the function of bi-directional transmission. The unidirectional transmission circuit 421 has only the function of unidirectional transmission.

The switch 44 is fixedly soldered onto the circuit board 41, and electrically connected to the circuit layout 42. The first connector 20 and one end of the transmission line 10 are fixedly soldered and electrically connected onto the circuit layout 42 of the circuit board 41. The unidirectional transmission circuit 421 or the bi-directional transmission circuit 422 can be selected for use through switching of the switch 44. A USB transmission line having switching function of the present invention is thus formed.

Figure 4:
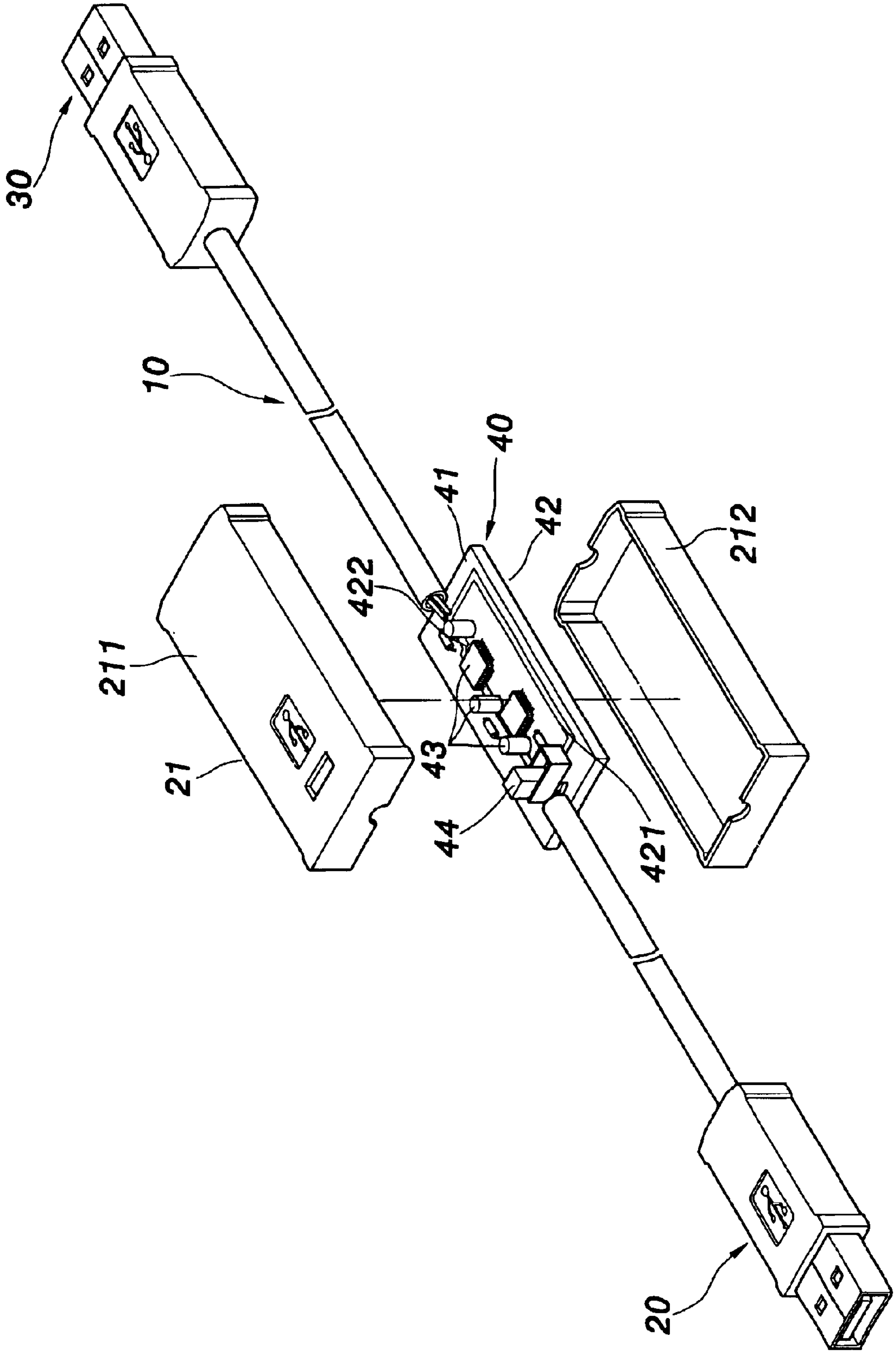
FIG. 4 is an exploded perspective view of another embodiment of the present invention.

As shown in FIG. 4, in the present invention, the circuit board 41 of the circuit unit 40 can also be disposed on the transmission line 10. The circuit board 41 is located at an intermediate position of the transmission line 10. That is, the transmission line 10 is cut at an intermediate position thereof, and the two cut ends of the transmission line 10 are fixedly soldered onto the circuit board 41 of the circuit unit 40 and electrically connected onto the circuit layout 42 of the circuit board 41.

The first connector 20 and the second connector 30 are electrically connected to the circuit layout 42 of the circuit board 41 through the transmission line 10. The unidirectional transmission circuit 421 or the bi-directional transmission circuit 422 can be selected for use through switching of the switch 44. A housing 21 is also provided to sheathe and fix the connection portion of the circuit board 41 and the transmission line 10.

Figure 5:
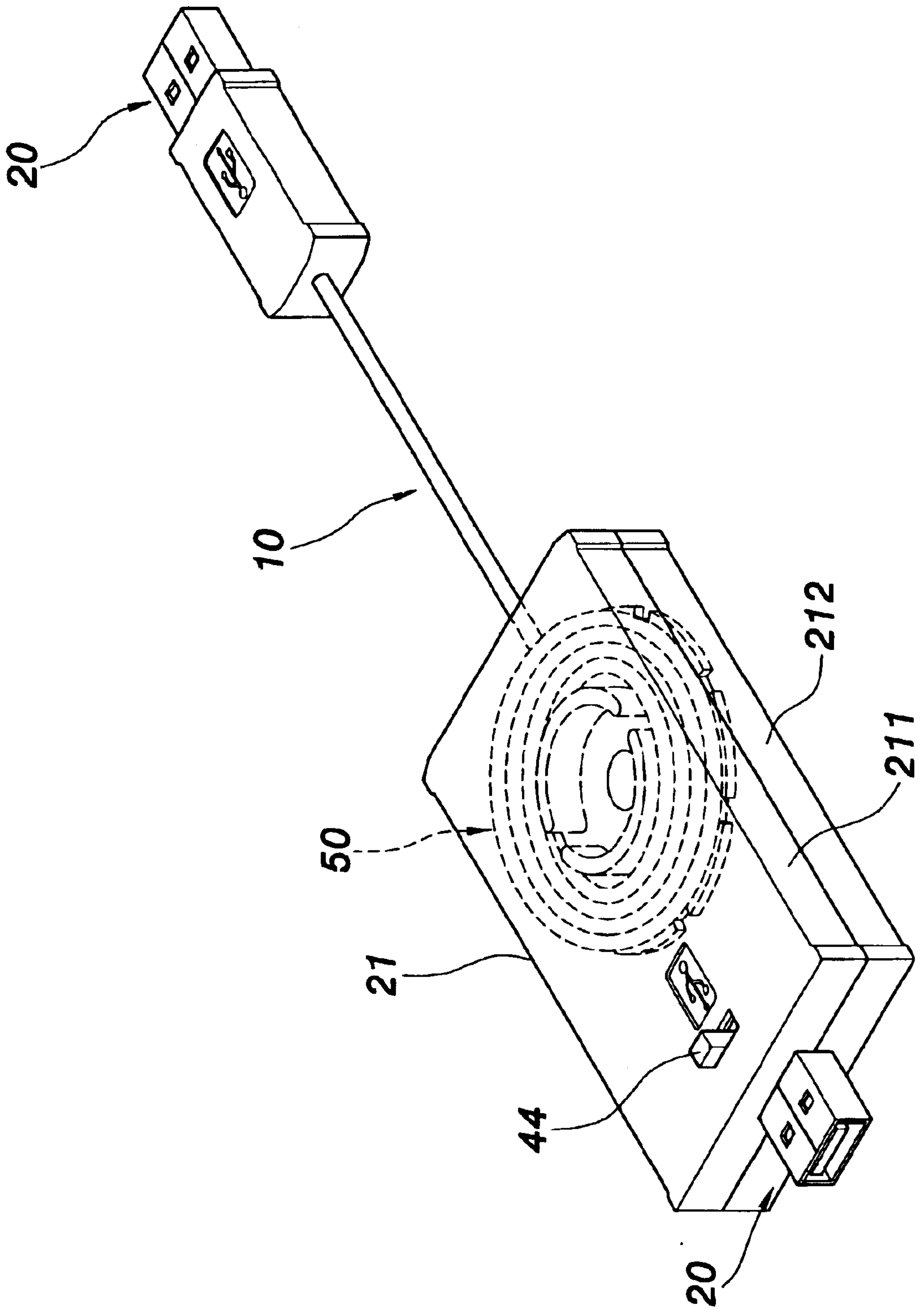
FIG. 5 is a perspective assembly view of yet another embodiment of the present invention.

As shown in FIG. 5, in the present invention, a wire-winding mechanism 50 can be disposed in the shell body 21 of the first connector 20. The transmission line 10 can be elastically wound in the wire-winding mechanism 50. The wire-winding mechanism 50 can wind up and receive the transmission line 10 of a considerable length. The transmission line 10 can be pulled out from the wire-winding mechanism 50. A certain restoring tension can be kept on the transmission line 10 through the action of a spiral reel (not shown) in the wire-winding mechanism 50 so that the transmission line 10 can be successfully wound back. Therefore, entanglement of wire due to a too-long length or inconvenience of use due to a too-short length will not arise.

To sum up, the present invention is characterized in that the circuit unit 40 having switching function of unidirectional transmission and bi-directional transmission is disposed on the transmission line 10. The unidirectional transmission circuit 421 or the bi-directional transmission circuit 422 can be selected for use through switching of the switch 44 so that the transmission line 10 can flexibly select the unidirectional transmission function or the bi-directional transmission function according to practical necessity. The USB transmission line of-the present invention can thus have both unidirectional transmission and bi-directional transmission functions, resulting in more convenient, more flexible, and wider use.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A USB transmission line having switching function, comprising:

a transmission line;

a first connector and a second connector being USB connectors, said first and second connectors being connected at two ends of said transmission line; and a circuit unit having switching function of unidirectional transmission and bi-directional transmission, said circuit unit being disposed on said transmission line between said first and second connectors.

2. The USB transmission line having switching function as claimed in claim 1, wherein said circuit unit has a circuit board disposed on said transmission line between said first and second connectors, said circuit board has a circuit layout, electronic components, and a switch thereon, and said circuit layout has a unidirectional transmission circuit and a bi-directional transmission circuit, and said electronic components are electrically connected to said bi-directional transmission circuit to let said bi-directional transmission circuit have the bi-directional transmission function, and said switch is electrically connected to said circuit layout, and said unidirectional transmission circuit or said bi-directional transmission circuit are selected for use through switching of said switch.

3. The USB transmission line having switching function as claimed in claim 2, wherein said circuit board of said circuit unit is disposed in a shell body of said first connector.

4. The USB transmission line having switching function as claimed in claim 2, wherein said circuit board of said circuit unit is disposed at an intermediate position of said transmission line.

5. The USB transmission line having switching function as claimed in claim 1 further comprising a wire-winding mechanism, said transmission line being elastically wound in said wire-winding mechanism.

* * * * *